(12) United States Patent
Giroux et al.

(10) Patent No.: US 9,471,307 B2
(45) Date of Patent: Oct. 18, 2016

(54) SYSTEM AND PROCESSOR THAT INCLUDE AN IMPLEMENTATION OF DECOUPLED PIPELINES

(71) Applicant: NVIDIA Corporation, Santa Clara, CA (US)

(72) Inventors: Olivier Giroux, Santa Clara, CA (US); Michael Alan Fetterman, Boxborough, MA (US); Robert Ohannessian, Jr., Austin, TX (US); Shirish Gadre, Fremont, CA (US); Jack H. Choquette, Palo Alto, CA (US); Xiaogang Qiu, San Jose, CA (US); Jeffrey Scott Tuckey, Saratoga, CA (US); Robert James Stoll, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 172 days.

(21) Appl. No.: 14/147,439

(22) Filed: Jan. 3, 2014

(65) Prior Publication Data

US 2015/0193272 A1     Jul. 9, 2015

(51) Int. Cl.
  *G06F 9/46*     (2006.01)
  *G06F 9/30*     (2006.01)

(52) U.S. Cl.
  CPC ................ *G06F 9/30007* (2013.01)

(58) Field of Classification Search
  None
  See application file for complete search history.

(56) References Cited

U.S. PATENT DOCUMENTS

| | | | |
|---|---|---|---|
| 7,444,491 B1* | 10/2008 | Steinbusch | 711/170 |
| 7,844,796 B2* | 11/2010 | Vorbach et al. | 712/18 |
| 8,108,659 B1* | 1/2012 | Le Grand | 712/225 |
| 2006/0031565 A1* | 2/2006 | Iyer et al. | 709/234 |
| 2007/0214343 A1* | 9/2007 | Lindholm et al. | 712/220 |
| 2009/0083499 A1* | 3/2009 | Mediratta | 711/154 |
| 2009/0144522 A1* | 6/2009 | Vorbach et al. | 712/15 |
| 2010/0005250 A1* | 1/2010 | Simon et al. | 711/154 |
| 2011/0072243 A1* | 3/2011 | Qiu et al. | 712/214 |
| 2011/0078427 A1* | 3/2011 | Shebanow et al. | 712/244 |
| 2012/0110586 A1* | 5/2012 | Coon et al. | 718/102 |
| 2012/0198214 A1* | 8/2012 | Gadre et al. | 712/225 |
| 2012/0216012 A1* | 8/2012 | Vorbach et al. | 712/11 |
| 2014/0181475 A1* | 6/2014 | Abdallah | G06F 9/30043 712/207 |
| 2014/0237212 A1* | 8/2014 | Garg et al. | 711/205 |

* cited by examiner

*Primary Examiner* — Dong Kim
(74) *Attorney, Agent, or Firm* — Zilka-Kotab, PC

(57) ABSTRACT

A system and apparatus are provided that include an implementation for decoupled pipelines. The apparatus includes a scheduler configured to issue instructions to one or more functional units and a functional unit coupled to a queue having a number of slots for storing instructions. The instructions issued to the functional unit are stored in the queue until the functional unit is available to process the instructions.

16 Claims, 6 Drawing Sheets

SYSTEM AND PROCESSOR THAT INCLUDE AN IMPLEMENTATION OF DECOUPLED PIPELINES

FIELD OF THE INVENTION

The present invention relates to processor architectures, and more particularly to processors with multiple pipelines.

BACKGROUND

Many conventional processors implement pipeline techniques to make the processor more efficient. Pipelining is an architecture that enables a long-latency operation to be divided into multiple stages where the output of one stage is the input to the next stage. Pipelining allows a system architect to hide some latency within a system by processing multiple instructions at the same time within the pipeline.

Some pipelines, such as pipelines implemented in texture units, may receive requests (i.e., instructions) from multiple, independent schedulers within the processor, or from a single scheduler executing multiple threads. Compilers may be configured to optimize code in a particular thread by matching the order of instructions with the known throughput of the various pipelines the instructions are configured to be issued to. For example, if a processor includes 32 threads executing simultaneously utilizing 32 arithmetic logic units (ALUs) and 16 double precision units (DPUs), the compiler may order the instructions of the 32 threads to issue any instructions routed to the DPU every other instruction to allow for 2 cycles for the 16 DPUs to process the single instruction from the 32 threads. However, in some processors, many pipelines have a variable throughput such that the compiler cannot properly optimize the code at compile-time. The throughput of a particular pipeline may be variable if the resource accesses some other resource (e.g., a memory access) that has a variable latency. Furthermore, in multi-threaded systems, the compiler may not have an accurate scope at compile time of which threads are executed and in what order. Thus, the compiler cannot accurately track which resources should be available when a particular instruction is issued. Thus, there is a need for addressing this issue and/or other issues associated with the prior art.

SUMMARY

A system and apparatus are provided that include an implementation for decoupled pipelines. The apparatus includes a scheduler configured to issue instructions to one or more functional units and a functional unit coupled to a queue having a number of slots for storing instructions. The instructions issued to the functional unit are stored in the queue until the functional unit is available to process the instructions.

DETAILED DESCRIPTION

A processor may include one or more functional units associated with a decoupled pipeline. One or more schedulers may be configured to issue instructions to the functional units. Each scheduler may arbitrate among a plurality of threads to determine which instructions are ready to be issued in a given clock cycle. The functional units are coupled to corresponding queues that provide a small amount of temporary storage for instructions issued to the functional unit. The queues may buffer a number (e.g., 16, 32, etc.) of instructions received by the functional unit until the functional unit is available to process another instruction. Thus, the schedulers may issue instructions at a rate of one instruction per clock cycle to any functional unit associated with a decoupled pipeline as long as there is at least one empty slot in the queue associated with that functional unit. The architecture described above may prevent the scheduler from stalling issuance of an instruction from a particular thread when the resource required to process that instruction is not available. This enables the scheduler to issue instructions that are ordered subsequent to that instruction to other functional units that have resources available to process such instructions.

For example, a processor may include a scheduler that is coupled to an arithmetic logic unit (ALU) for performing integer math operations and a load store unit (LSU) for reading values from a memory coupled to the processor. If the next instruction in a thread is a load instruction, the scheduler may transmit the load instruction to the LSU even if the LSU is unavailable to process the instruction because the LSU is processing a previously issued instruction. The issuance of the load instruction enables the scheduler to issue a math instruction to the ALU during the next clock cycle, even though the LSU has not processed the previous instruction in the thread (i.e., the load instruction). It will be appreciated that the scheduler may only issue instructions that have had all dependencies resolved at the time of issuance. In other words, the scheduler must still determine that any source operands referenced as input to the instruction have been loaded with the correct data and that any output operands are available to be written to at the time the instruction is issued. Various mechanisms well-known in the art, such as scoreboarding or register renaming, may be implemented to manage the protection of source operands and output operands.

Figure 1A:
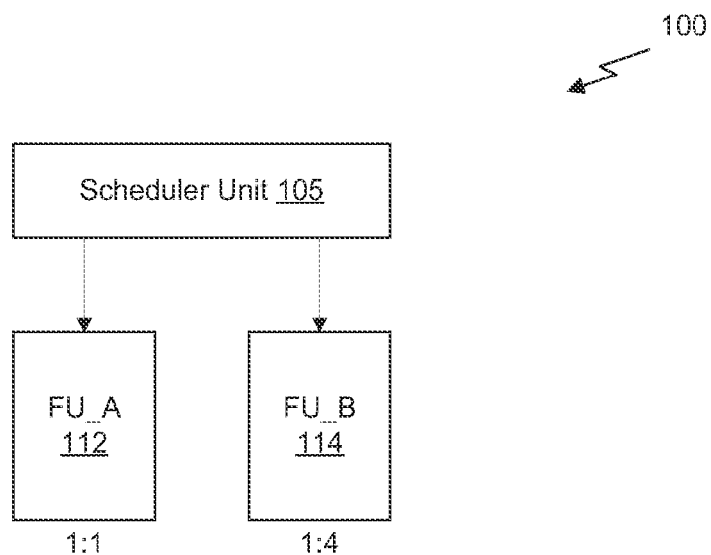
FIG. 1A illustrates a processor that includes multiple pipelines, according to the prior art.

FIG. 1A illustrates a processor 100 that includes multiple pipelines, according to the prior art. As shown in FIG. 1A, the processor 100 includes a scheduler 105 coupled to multiple functional units that implement a pipeline architecture. A first functional unit (FU_A) 112 is directly coupled to the scheduler 105 and has a throughput of 1:1 (i.e., one instruction is processed by the functional unit every clock cycle). A second functional unit (FU_B) 114 is also directly coupled to the scheduler 105 and has a throughput of 1:4 (i.e., one instruction is processed by the functional unit every four clock cycles). The throughput of the functional units may be fixed when the functional units are exclusively coupled to a single scheduler issuing instructions from a single thread or a group of related threads (i.e., where each thread is an instance of the same program operating on different data) and the operations performed by the pipeline stages within each functional unit are not dependent on variable latency operations (such as memory accesses).

In order to optimize execution of a program on processor 100, a compiler may order the instructions in a way that helps ensure an optimal use of available resources within the processor 100. Because the compiler can implement a state machine, when a particular instruction for a given resource (i.e., functional unit) is included in the program, the compiler can determine when that resource should be available to process another instruction. For example, for each instruction that is configured to be executed by the second functional unit 114, the compiler will attempt to order three instructions between that instruction and the next subsequent instruction configured to be executed by the second functional unit 114. The compiler matches the frequency of the instructions in the program to the known throughput of the functional units, thereby reducing cycles during execution where the scheduler delays issuance of an instruction to the functional units because the functional unit is busy.

These types of optimizations are easily implemented when the throughput of the functional units are easily modeled. However, many processors may include functional units that may have a variable throughput. For example, a particular functional unit may comprise a shared resource that can have instructions issued to the functional unit by two or more schedulers or even different threads managed by the same scheduler. In such cases, the compiler cannot model how instructions are going to be issued from multiple, unrelated threads. In addition, one or more stages of the pipeline implemented by a functional unit may perform operations that have variable latency. For example, a particular stage of a texture unit may load texture samples from a memory. Performing memory access operations can cause a delay based on the number of units attempting to access the memory substantially simultaneously. Such delays may stall conventional schedulers from issuing another instruction to the texture unit even if independent instructions from such threads could be executed by other available resources.

Figure 1B:
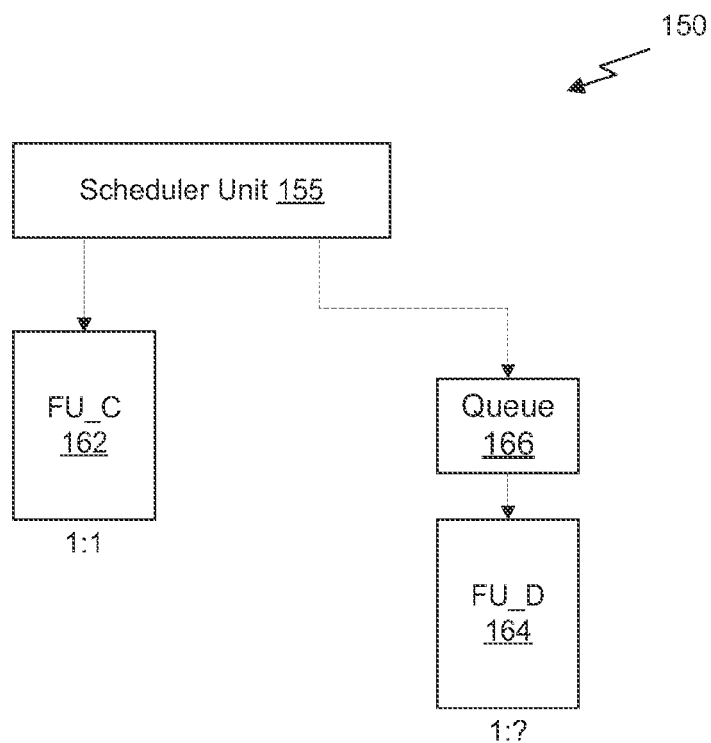
FIG. 1B illustrates a processor that implements decoupled pipelines, in accordance with one embodiment.

FIG. 1B illustrates a processor 150 that implements decoupled pipelines, in accordance with one embodiment. Decoupled pipelines enable the scheduler to issue instructions asynchronously from the processing of the instructions by the pipeline. As shown in FIG. 1B, the processor 150 includes a scheduler 155 coupled to multiple functional units that implement a pipeline architecture. A first functional unit (FU_C) 162 is directly coupled to the scheduler 155 and is similar to the first functional unit 112 of FIG. 1A. In contrast to processor 100, however, a second functional unit (FU_D) 164 is decoupled (i.e., indirectly coupled) from the scheduler 155. The second functional unit 164 is associated with a queue 166. In one embodiment, the queue 166 may be a conventional first-in, first-out (FIFO) implemented in a static random access memory coupled to the input of the second functional unit 164. The queue 166 enables the scheduler 155 to issue instructions to the second functional unit 164 over a number of consecutive clock cycles without regard to whether the second functional unit 164 is available to process the instructions immediately.

For example, a program may include 16 instructions, 12 instructions configured to be executed by the first functional unit 162 and four instructions configured to be executed by the second functional unit 164. If the throughput of the functional units was known, such as described above in conjunction with FIG. 1A, then the compiler may order the instructions to include three instructions for the first functional unit 162 between any two instructions for the second functional unit 164. However, since the throughput of the functional units is not known (because the functional units are a shared resource), the compiler can simply order each of the four instructions for the second functional unit 164 consecutively and the scheduler 155 can issue the four instructions to the second functional unit 164 in four consecutive clock cycles. The instructions are stored temporarily in the queue 166 and the second functional unit 164 processes the instructions in the order received from the scheduler 155 as the pipeline in the second functional unit 164 becomes available. The decoupled pipeline described above reduces the complexity of the compiler, which no longer needs to optimize instruction order based on resource availability, and prevents lower throughput operations from stalling other independent operations from being processed by an available resource.

It will be appreciated that reading the source operands specified by the instructions may be delayed while the instructions are temporarily stored in the queue 166. In other words, values located in the registers specified by the source operands of the instruction are not read until the instruction is popped from the queue 166 and the instruction is ready to be executed by the second functional unit 164.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
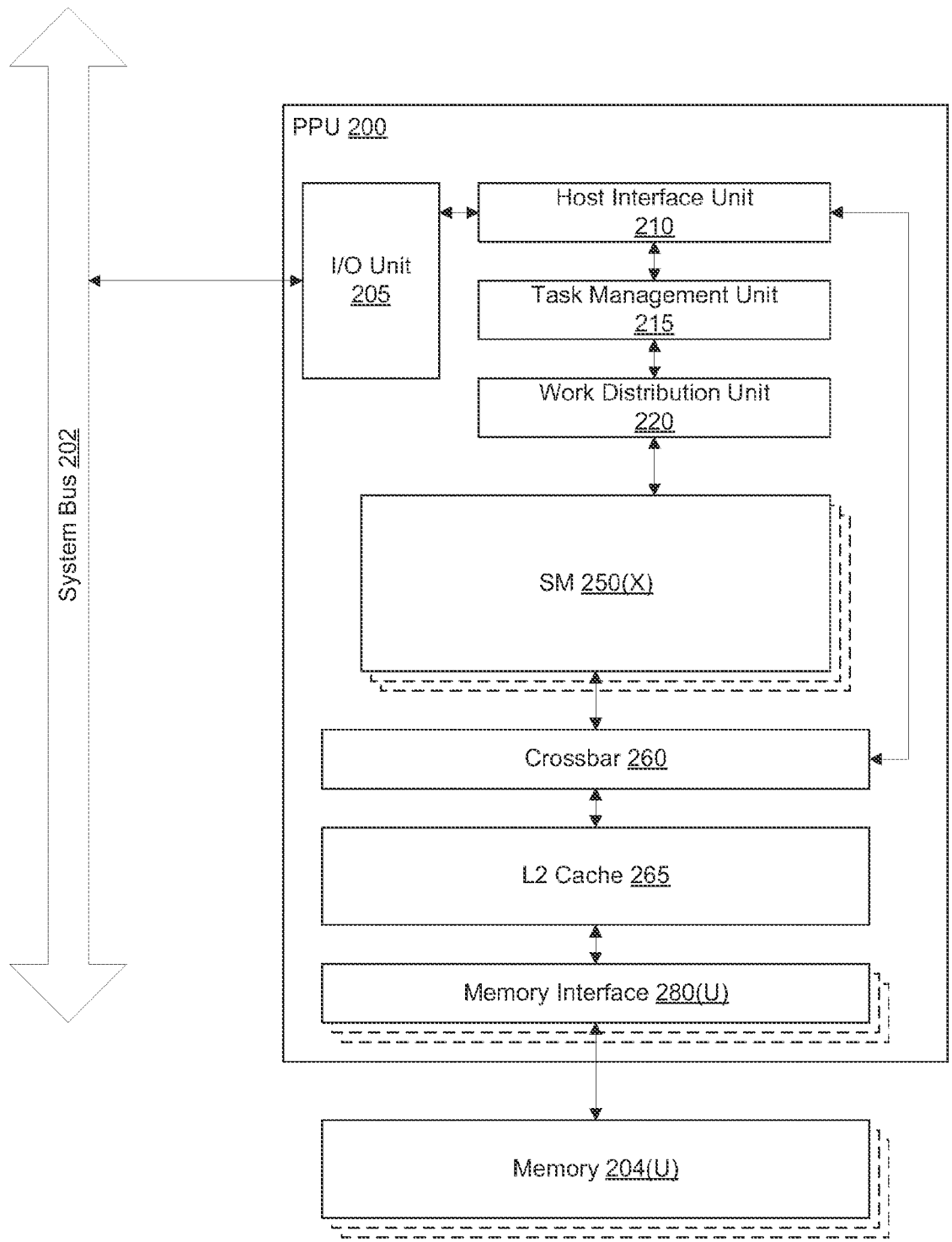
FIG. 2 illustrates a parallel processing unit (PPU), according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a Pete bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the task management unit (TMU) 215 with pointers to one or more streams. The TMU 215 selects one or more streams and is configured to organize the selected streams as a pool of pending grids. The pool of pending grids may include new grids that have not yet been selected for execution and grids that have been partially executed and have been suspended.

A work distribution unit 220 that is coupled between the TMU 215 and the SMs 250 manages a pool of active grids, selecting and dispatching active grids for execution by the SMs 250. Pending grids are transferred to the active grid pool by the TMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the TMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 200 comprises X SMs 250(X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 comprises U memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
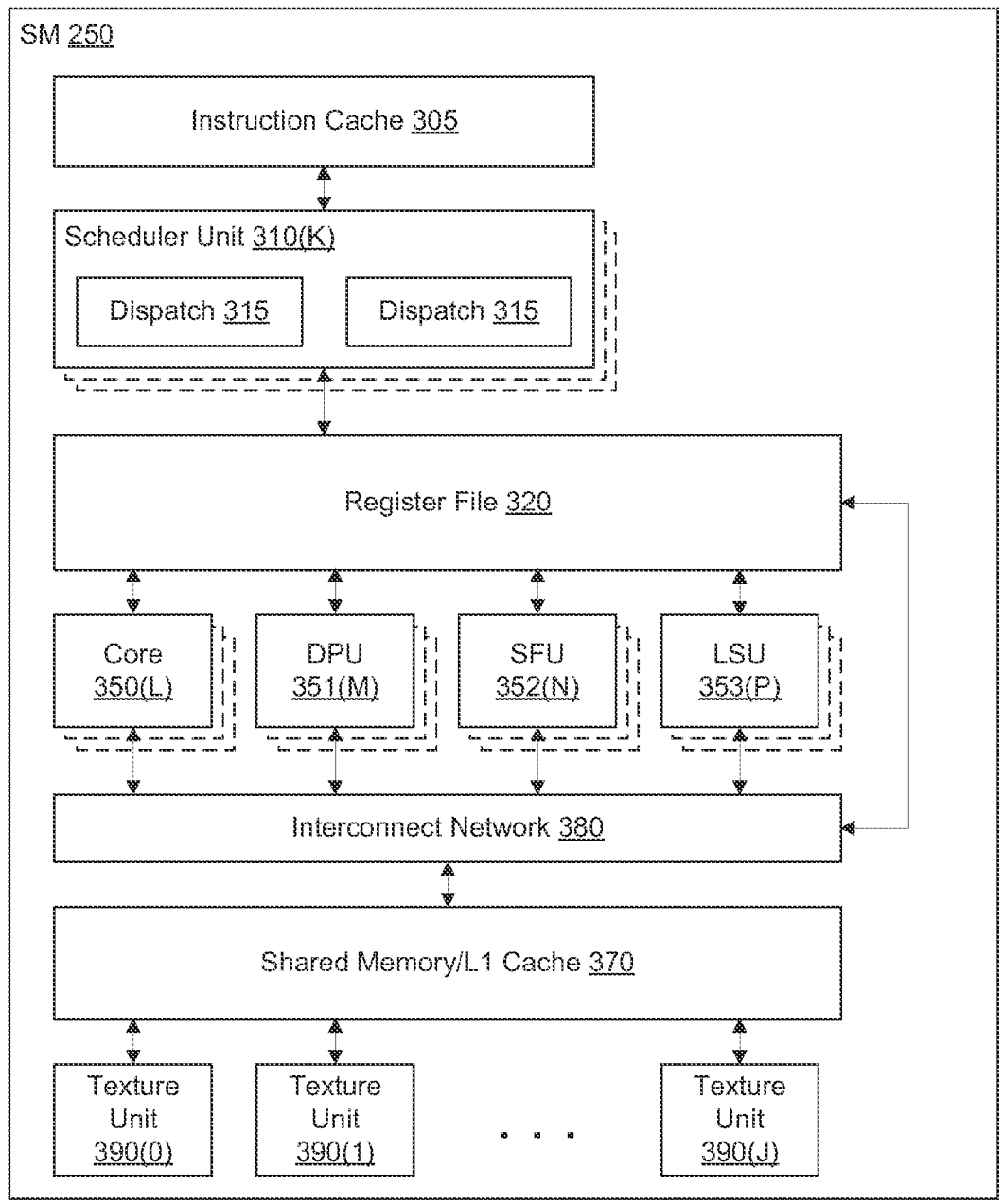
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory/L1 cache 370, and one or more texture units 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory/L1 cache 370 and the register file 320. In one embodiment, the SM 250 includes 64 DPUs 351, 32 SFUs 352, and 32 LSUs 353.

Each SM 250 includes an interconnect network 380 that connects each of the functional units to the register file 320 and the shared memory/L1 cache 370. In one embodiment, the interconnect network 380 is a crossbar that can be configured to connect any of the functional units to any of the registers in the register file 320 or the memory locations in shared memory/L1 cache 370.

In one embodiment, the SM 250 is implemented within a GPU. In such an embodiment, the SM 250 comprises J texture units 390. The texture units 390 are configured to load texture maps (i.e., a 2D array of texels) from the memory 204 and sample the texture maps to produce sampled texture values for use in shader programs. The texture units 390 implement texture operations such as anti-aliasing operations using mip-maps (i.e., texture maps of varying levels of detail). In one embodiment, the SM 250 includes 16 texture units 390.

The PPU 200 described above may be configured to perform highly parallel computations much faster than conventional CPUs. Parallel computing has advantages in graphics processing, data compression, biometrics, stream processing algorithms, and the like.

Figure 4:
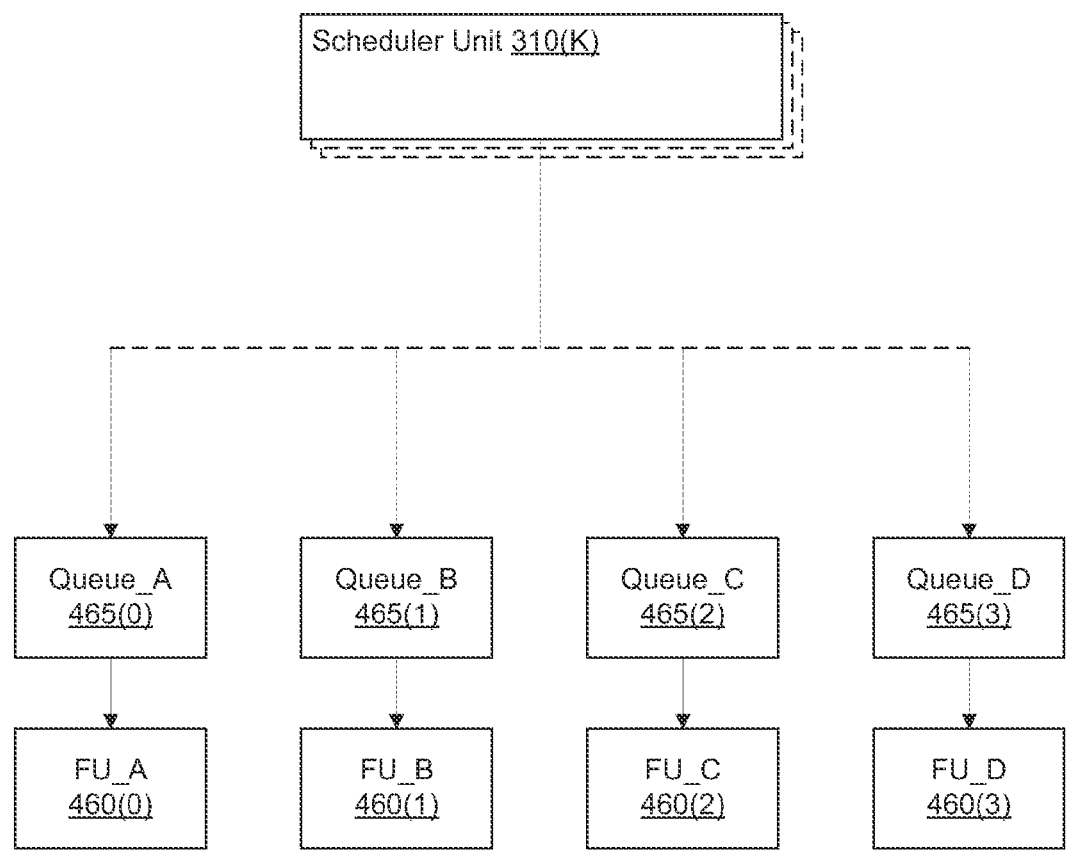
FIG. 4 illustrates a plurality of decoupled pipelines implemented within the PPU of FIG. 2, in accordance with one embodiment.

FIG. 4 illustrates a plurality of decoupled pipelines implemented within the PPU 200 of FIG. 2, in accordance with one embodiment. The one or more scheduler units 310 may be coupled to a plurality of functional units 460 having pipelined architecture. As shown in FIG. 4, the scheduler 310 may be coupled, indirectly, to four functional units 460(0), 460(1), 460(2), and 460(3) through four corresponding queues 465(0), 465(1), 465(2), and 465(3). In one embodiment, the functional units 460 may be one or more of the cores 350, the DPUs 351, the SFUs 352, and the LSUs 353 of FIG. 3. The queues 465 may be implemented in a static random access memory (SRAM) adjacent to each of the functional units 460 on a die for an integrated circuit that implements the PPU 200. Each queue 465 may include a number of slots for temporarily storing instructions that are issued to the corresponding functional unit 460. In one embodiment, each queue 465 may include 16 slots for instructions. In other embodiments, each queue 465 may include more or fewer slots for instructions.

A just-in-time (JIT) compiler implemented by a device driver for the PPU 200 may be configured to generate code for execution by one or more of the SMs 250. Unlike prior art devices, the compiler may not optimize the order of instructions based on the availability of processor resources because the decoupled pipelines can receive instructions at any rate specified by the program, given that at least one slot in the queue 465 is available. As long as the number of instructions sent to a particular pipeline does not fill up the corresponding queue 465 faster than the functional unit 460 can drain the queue 465, then the order of the instructions does not matter as long as any dependencies for the instruction have been resolved when the instruction is issued by the scheduler unit 310.

The scheduler unit 310 receives a command to schedule one or more threads associated with a plurality of instructions. The threads include instructions to be issued to one or more of the functional units 460. The scheduler unit 310 resolves any dependencies for the instructions (e.g., ensuring that operand data has been loaded into the register file 320, ensuring that an output register is not allocated to another issued instruction, etc.) and issues instructions from the threads to the one or more functional units 460. The queues 465 receive the instructions and temporarily store the instructions until the corresponding functional unit 460 is available to process the next pending instruction. Once the functional unit 460 is available, an instruction may be extracted (i.e., popped) from the queue 465 and processed by the functional unit 460.

In one embodiment, the queue 465 may transmit a signal to the scheduler unit(s) 310 when the queue 465 is full. For example, a signal (e.g., a one bit interconnect) may be asserted when the queue 465 has no empty slot available to store an instruction. When the signal is asserted, the scheduler unit(s) 310 may stall the issuance of any further instructions to the corresponding functional unit 460. Once the functional unit 460 has extracted at least one instruction from the queue 465, thereby creating an empty slot, the signal may be cleared and the scheduler unit(s) 310 may resume issuing instructions to the functional unit 460.

In one embodiment, the scheduler unit(s) 310 is configured to protect source operands and output operands for instructions issued to the functional units 460. While it is well known in the art that output operands for issued instructions should be protected until the operand is used by subsequent instructions, it is far less common that source operands need to be protected. This is because typically, when an instruction is issued, the source operands are immediately read into the data path and the registers may be used for other instructions. However, because the processing of the instructions (i.e., reading source operand values from the register file) is delayed while the instructions are stored in the queues 465, the scheduler unit(s) 310 is configured to implement some technique for protecting source operands as well.

In one embodiment, the scheduler unit(s) 310 may utilize a scoreboarding technique to track when registers have been read and or written by an issued instruction. When each instruction is issued by a scheduler unit 310, the scheduler unit 310 may increment a read counter associated with each source operand register as well as a write counter associated with a destination operand register for the instruction. When an instruction is extracted from the queue 465 by a functional unit 460, the source operands are read from the register file. The read counter for each of the source operands may then be decremented to indicate that the source operands have been read from the register file. Similarly, when the functional unit 460 finishes executing a particular instruction and has written the output to the destination operand register, the write counter for the destination operand register may be decremented to indicate that output for the instruction has been written to the register file.

The scheduler unit 310 may delay the issuing of any instruction that includes a destination operand register that is associated with a read counter that is not equal to zero. In other words, an instruction will be prevented from issuing if any previously issued instruction specifying the register as a source operand has not read a value from the register specified by the destination operand register in the instruction. Multiple instructions reading the same source operand register may be outstanding at any one time.

The scheduler unit 310 may also delay any instruction that is configured to read any source operand registers or write to a destination operand register associated with a write counter that is greater than zero. In one embodiment, the write counter may correspond to a single bit, such that only one instruction specifying a particular register as a destination operand may be in flight at any given time.

Figure 5:
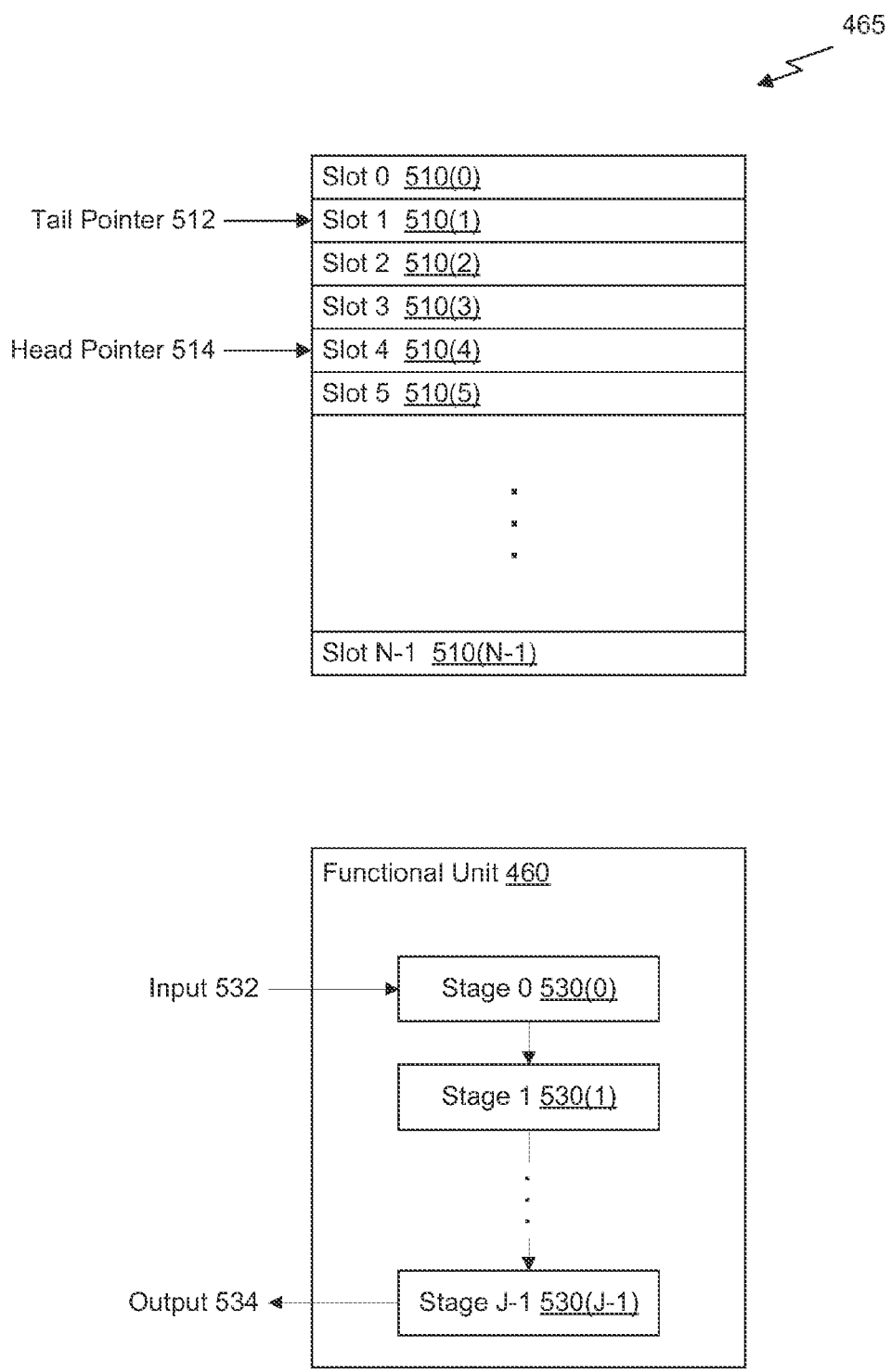
FIG. 5 illustrates a queue coupled to a functional unit, accordance with one embodiment.

FIG. 5 illustrates a queue 465 coupled to a functional unit 460, in accordance with one embodiment. As shown in FIG. 5, the queue 465 includes a plurality of slots 510 (e.g., N slots) for storing instructions transmitted to the functional unit 460. Each slot 510 may store, e.g., a 64-bit instruction transmitted to the functional unit 460. As described above, the queue 465 is a FIFO. In one embodiment, the FIFO may be implemented as a circular buffer including a head pointer 514 and a tail pointer 512. The head pointer 514 and the tail pointer 512 may be stored in special registers and point to a particular slot index within the queue 465. When the queue 465 receives instructions from the scheduler unit(s) 310, the instructions are added to the slot of the queue 465 pointed to by the head pointer 514. As the functional unit 460 becomes ready to process another instruction, the functional unit 460 extracts (i.e., pops) an instruction from the slot 510 of the queue 465 pointed to by the tail pointer 512. Each of the slots 510 in front of the head pointer 514 and behind the tail pointer 512 may include invalid data and may be referred to as empty slots (e.g., slot 0 510(0) as well as slot 5 510(5) through slot N−1 510(N−1)). As shown in FIG. 5, the head pointer 514 points to slot 4 510(4), which is an empty slot that may store the next instruction received from the scheduler unit(s) 310. The tail pointer 512 points to slot 1 510(1), stores the next instruction that will be processed by the functional unit 460. Slot 3 510(3) stores the last instruction received from the scheduler unit(s) 310 and slot 2 510(2) stores the next to last instruction received from the scheduler unit(s) 310. When the output 534 is written, the write counter may be decremented.

As also shown in FIG. 5, a functional unit 460 may implement a pipeline that includes a plurality of stages 530 (e.g., J stages). When the functional unit 460 is ready to execute an instruction, the functional unit may read an instruction from the slot 510 pointed to by the tail pointer 512. The instruction may cause the functional unit 460 to load an input 532 at the start of the datapath for the first stage (i.e., stage 0 530(0)) of the pipeline. The input 532 may include an opcode from the instruction as well as one or more operands specified by the instruction and read from the register file 320. The first stage 530(0) processes the input 532 and generates an intermediate output 534 that is passed to the input of the second stage 530(1). The second stage processes the output of the first stage 530(0) and generates an intermediate output that is passed to the input of the next stage, and so forth. The last stage (i.e., stage J−1 530(J−1)) generates the output 534 that is written back to, e.g., the register file 320 or the shared memory/L1 cache 370 as specified by the output operand of the instruction.

Figure 6:
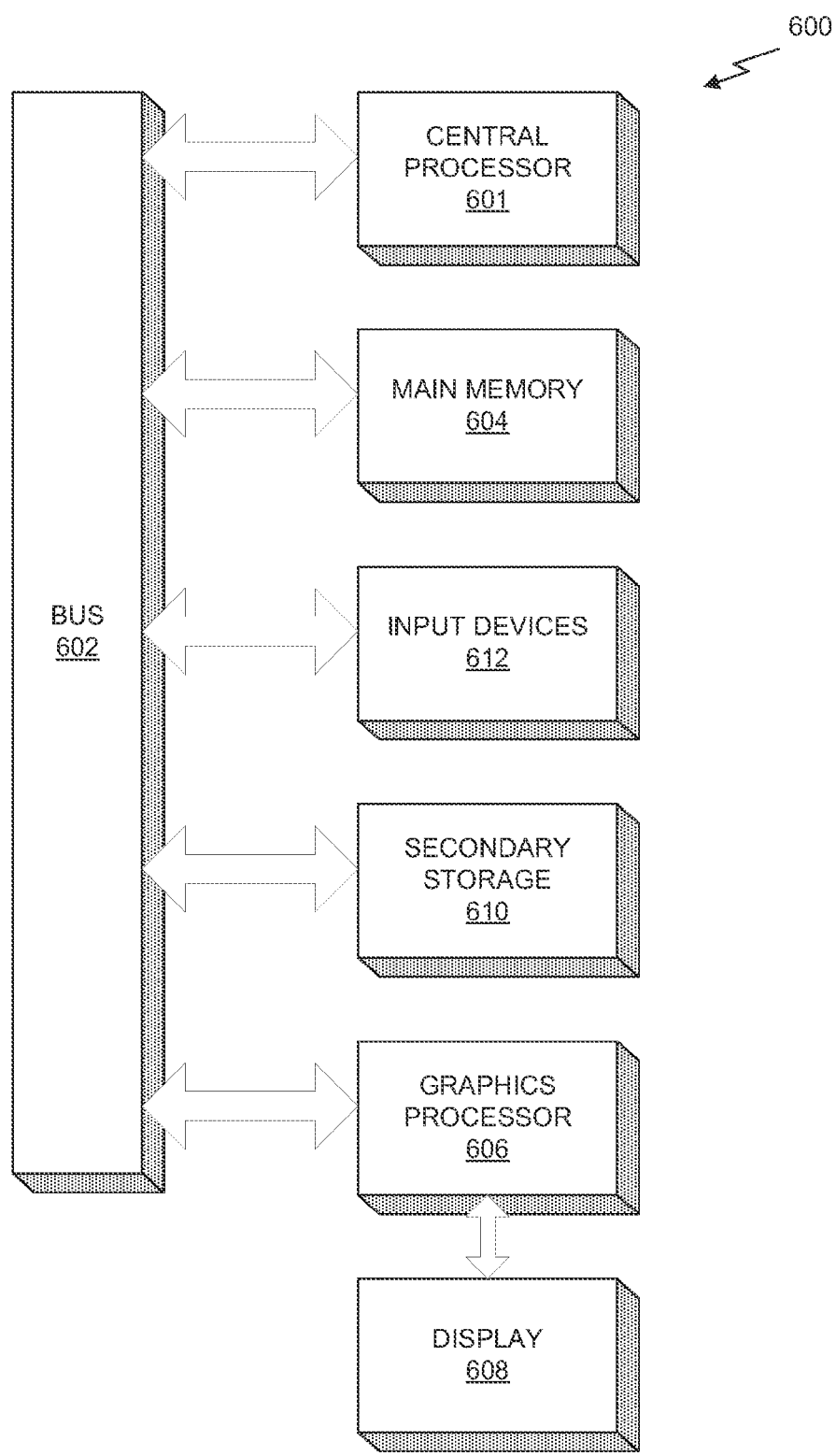
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (MID) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus comprising:
a scheduler configured to issue instructions to one or more functional units, wherein the scheduler is configured to utilize counters to manage protection of source operands; and
a functional unit coupled to a queue having a number of slots for storing instructions,
wherein instructions issued to the functional unit are stored in the queue until the functional unit is available to process the instructions,
wherein the counters comprise a read counter and a write counter associated with each register of a register file, and wherein the read counter for a particular register is incremented when an instruction specifying the particular register as a source operand is issued to the functional unit and decremented when the source operand is read from the register file, and wherein the write counter for the particular register is incremented when an instruction specifying the particular register as a destination operand is issued to the functional unit and decremented when an output for the instruction is written to the register file, and
wherein the scheduler, the one or more functional units, and the queue are included in a processor.

2. The apparatus of claim 1, wherein the queue comprises a first-in, first-out (FIFO).

3. The apparatus of claim 1, wherein, for each instruction issued to the functional unit, reading one or more source operands for the instruction is delayed until the instruction is popped from the queue.

4. The apparatus of claim 1, further comprising a second functional unit coupled to a second queue having a second number of slots for storing instructions, and wherein instructions issued to the second functional unit are stored in the second queue until the second functional unit is available to process the instructions.

5. The apparatus of claim 4, wherein the functional unit has a first instruction throughput and the second functional unit has a second instruction throughput that is different from the first instruction throughput.

6. The apparatus of claim 1, wherein the functional unit is one of a group consisting of an arithmetic logic unit (ALU), a double precision unit (DPU), a load store unit (LSU), a special function unit (SFU), and a texture unit.

7. The apparatus of claim 1, wherein the queue is implemented in static random access memory located adjacent to the functional unit on a die for an integrated circuit.

8. The apparatus of claim 1, wherein the apparatus comprises a graphics processing unit.

9. The apparatus of claim 1, wherein the apparatus is multi-threaded.

10. The apparatus of claim 1, wherein the apparatus is a system-on-chip (SoC) that includes one or more graphics processing units.

11. A system comprising:
a processor that includes:
a scheduler configured to issue instructions to one or more functional units, wherein the scheduler is configured to utilize counters to manage protection of source operands, and
a functional unit coupled to a queue having a number of slots for storing instructions,
wherein instructions issued to the functional unit are stored in the queue until the functional unit is available to process the instructions,
wherein the counters comprise a read counter and a write counter associated with each register of a register file, and wherein the read counter for a particular register is incremented when an instruction specifying the particular register as a source operand is issued to the functional unit and decremented when the source operand is read from the register file, and wherein the write counter for the particular register is incremented when an instruction specifying the particular register as a destination operand is issued to the functional unit and decremented when an output for the instruction is written to the register file.

12. The system of claim 11, wherein, for each instruction issued to the functional unit, reading one or more source operands for the instruction is delayed until the instruction is popped from the queue.

13. The system of claim 11, the processor further comprising a second functional unit coupled to a second queue having a second number of slots for storing instructions, and wherein instructions issued to the second functional unit are stored in the second queue until the second functional unit is available to process the instructions.

14. The system of claim 11, wherein the processor comprises a graphics processing unit (GPU).

15. The system of claim 14, further comprising a host processor coupled to the processor via a bus and a memory storing a device driver configured to control the operation of the processor.

16. The system of claim 11, wherein the system comprises a system-on-chip (SoC).

* * * * *